Feb. 20, 1968  R. G. HEYL, JR  3,369,841
POSITIONING MECHANISM FOR A RECLINING SEAT
Filed Dec. 10, 1964  4 Sheets-Sheet 1
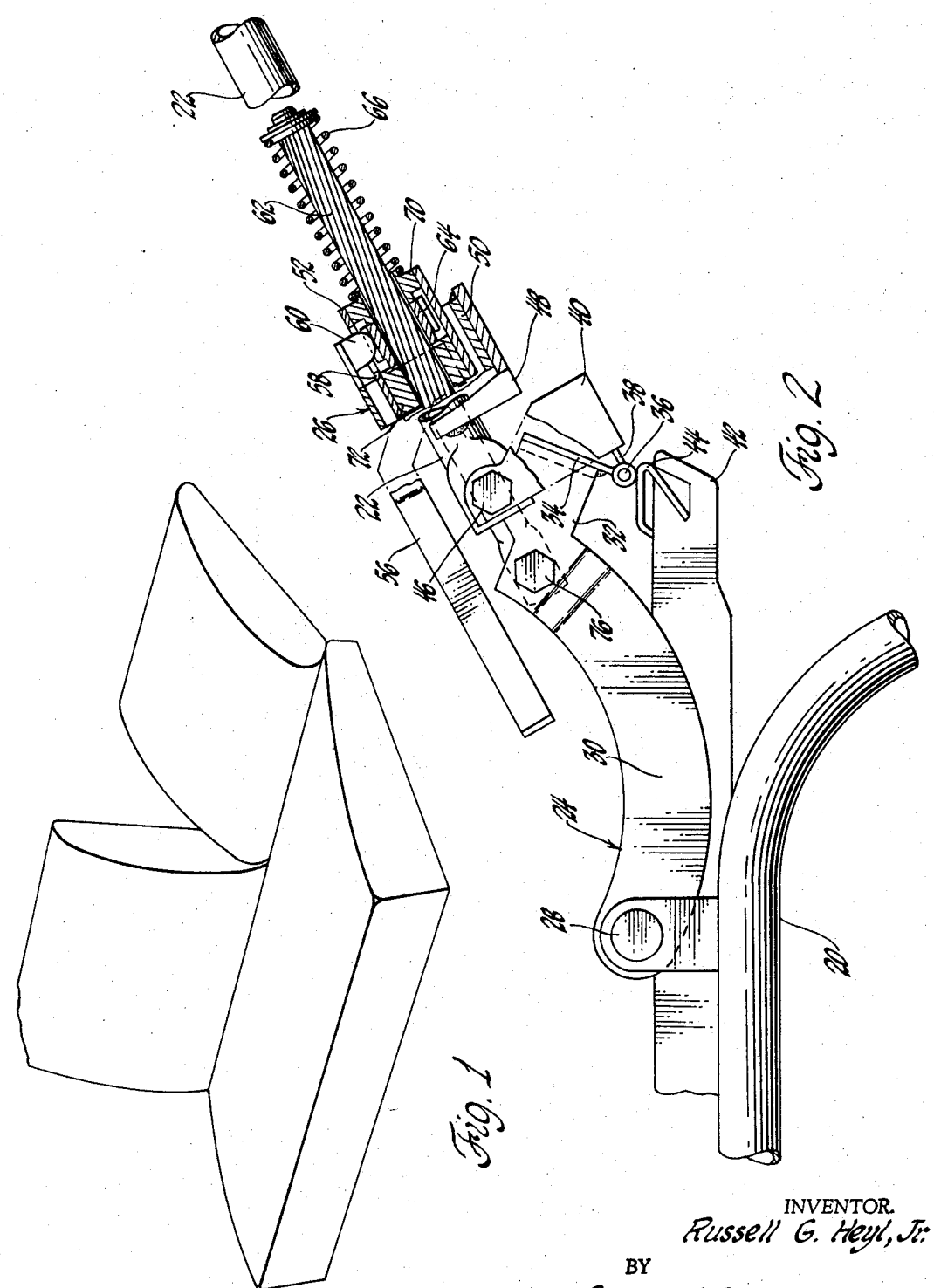
INVENTOR.
Russell G. Heyl, Jr.
BY
Barnard, McGlynn & Reising
ATTORNEYS

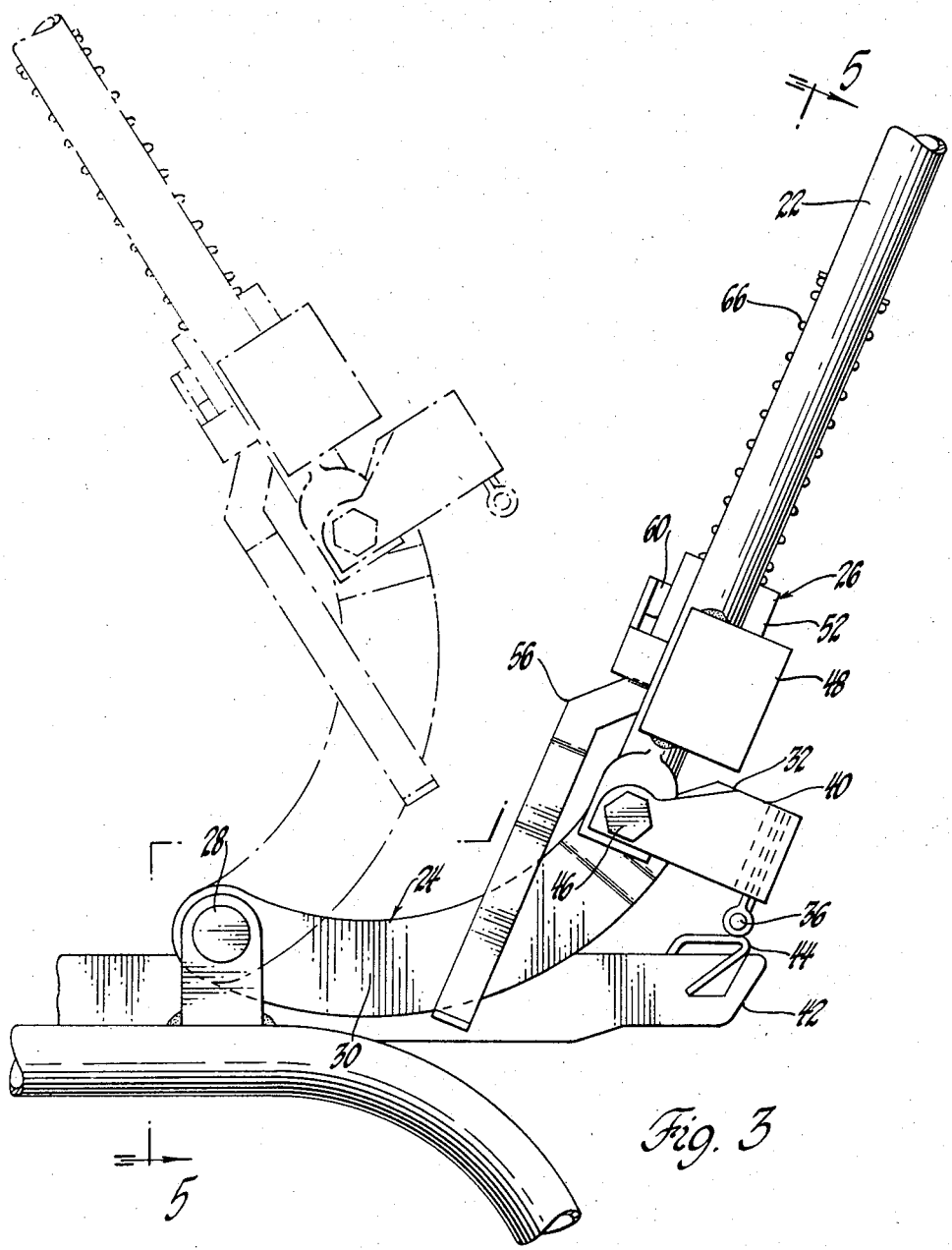

Feb. 20, 1968  R. G. HEYL, JR  3,369,841
POSITIONING MECHANISM FOR A RECLINING SEAT
Filed Dec. 10, 1964  4 Sheets-Sheet 3

INVENTOR.
Russell G. Heyl, Jr.
BY
Barnard, McGlynn & Reising
ATTORNEYS

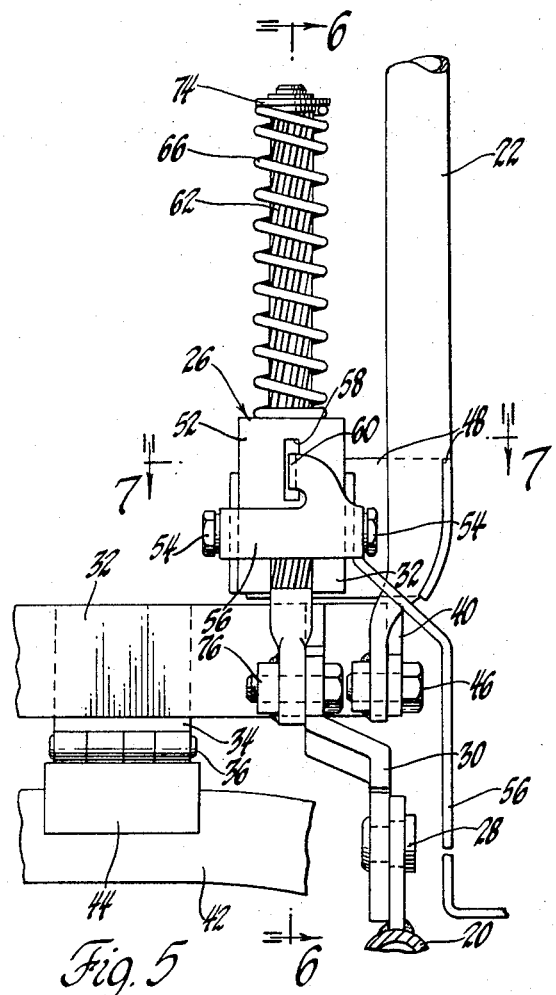

United States Patent Office 3,369,841
Patented Feb. 20, 1968

3,369,841
POSITIONING MECHANISM FOR A
RECLINING SEAT
Russell G. Heyl, Jr., Birmingham, Mich., assignor, by
mesne assignments, to Lear Siegler, Inc., Santa
Monica, Calif., a corporation of Delaware
Filed Dec. 10, 1964, Ser. No. 417,462
16 Claims. (Cl. 297—361)

ABSTRACT OF THE DISCLOSURE

A positioning mechanism for controlling the reclining of a seat assembly and including a male threaded element, a female threaded element threadedly engaging the male element for rotation thereon and consequent axial movement therealong in response to a force urging such movement, the female element having notches thereabout and a control means for selectively engaging the notches of the nut for preventing rotation of the female element to prevent relative axial movement between the male element and the female element.

The present invention relates to a reclining-backed seat assembly and, more particularly, to a seat utilizing a positioning mechanism to selectively control the position of the reclining seat back, and which upon actuation returns the seat back from a reclined position to the upright position, and which provides a resistance to movement of the seat back to prevent rapid acceleration of the seat back from one position to another so that the exact desired reclined position of the seat back may be selected when the seat back first reaches that position.

Reclining-backed seats of the type to which the instant invention may be utilized usually comprise a seat back frame operably connected to a seat frame for pivotal movement relative thereto. Normally, the desired reclined position of the seat back is attained by a positioning mechanism interconnecting the seat frame with the seat back frame and manually operated to allow relative pivotal movement between the seat frame and the seat back frame. Such a positioning mechanism usually positively secures the seat back frame in a seletced reclined position and upon actuation allows free and unrestrained relative pivotal movement between the seat frame and the seat back frame. Some of the positioning mechanisms which have been used to determine the reclined position of the seat back frame are adaptable so that upon actuation they also return the seat back frame to the upright position from a reclined position.

The positioning mechanisms which have been utilized to determine the position to which a seat back is reclined are adequate in holding the seat back in a particular position but they have not proven altogether satisfactory in their operation in regard to the movement of the seat back frame from one position to another. The problem associated with such a positioning mechanism is that upon actuation thereof the seat back frame is completely unrestrained and free to move relative to the seat frame back and forth between the upright position and the various reclined positions. This completely free and unrestrained movement makes it difficult for an individual to precisely select the desired reclined position of the seat back frame. For example, an individual sitting in a seat having a reclinable back actuates the positioning mechanism to allow the seat back frame to freely pivot relative the seat frame when a force is applied to the seat back frame with his body. Due to the completely free and unrestrained movement of the seat back, it rapidly accelerates toward the most reclined position and, therefore, makes it very difficult for the individual to release the positioning mechanism to stop the seat back frame in the exact reclined position desired. Usually what happens is that as the individual pushes the seat back frame toward a reclining position, the seat back frame overshoots the desired reclined position and the individual stops further reclining of the seat back frame by engaging the positioning mechanism. The individual then moves the seat back frame in the opposite direction toward the particular reclined position desired after having disengaged the positioning mechanism. The free and unrestrained movement of the seat back frame often causes the individual to make several passes before he is able to stop the seat back frame in the desired reclined position. This problem is alleviated somewhat by positioning mechanisms which automatically return the seat back frame to the upright position since such positioning mechanisms provide a resistance to reclining movement of the seat back frame. In such a situation, the movement of the seat back frame toward a reclined position is resisted so that the seat back frame may be moved slowly whereby the positioning mechanism may be utilized to lock the seat back frame in the precise desired reclined position. However, positioning mechanisms which upon actuation move the seat back frame from a reclined position to the upright position have unrestrained and free movement toward the upright position so that the seat back frame may rapidly accelerate toward the upright position making it difficult to stop the seat back frame at the exact desired position.

Accordingly, it is an object and feature of the present invention to provide a positioning mechanism suitable for use with a reclining-backed seat which upon actuation provides a resistance to the back and forth movement of the reclining back between the upright and various reclined positions.

Another object and feature of the present invention is to provide a positioning mechanism suitable for use with a reclinable seat back which will normally secure the reclining back in a particular desired position and which upon actuation urges the seat back toward the upright position, and which provides a resistance to the movement of the seat back between various positions to prevent rapid acceleration of the seat back and to allow the seat back to be smoothly moved at a predetermined controlled rate to a particular position and stopped.

In general, these and other objects may be accomplished by a positioning mechanism constructed in accordance with the invention having a female element threadedly engaging a male element for rotation thereon and consequent movement therealong in response to a force urging movement of the female element along the male element. The female element includes means for selectively preventing movement thereof along the male element. A biasing means is included to urge the female element in one direction along the male element for causing rotation of the female element on the male element to move the female element along the male element. Thus, the male element may be attached to the seat frame and the female element may be attached to the seat back frame of a reclining-backed seat, or vice versa, so that when the female element is prevented from rotating, and consequently, from moving along the male element, the seat back frame will be prevented from moving. When the female element is allowed to rotate, the biasing means acts against the female element to move the seat back frame toward the upright position, and when the seat back frame is moved in either direction, there is provided a resistance to the movement due to the coaction of the threads on the male and female elements.

Other objects and attendant advantages of this invention will be readily appreciated as the same becomes better understood by reference to the following detailed description when considered in conjunction with the accompanying drawings wherein:

FIGURE 1 is a perspective view of an illustrative vehicle seat arrangement in which the inventive principles of this invention may be embodied;

FIGURE 2 is a partial side elevational view of the framework of the vehicle seat shown in FIGURE 1;

FIGURE 3 is a side elevational view of the seat framework;

FIGURE 5 is a view taken along line 5—5 of FIGURE 3;

FIGURE 6 is a cross-sectional view taken along line 6—6 of FIGURE 5; and

FIGURE 7 is a cross-sectional view taken along line 7—7 of FIGURE 5.

Figure 4:
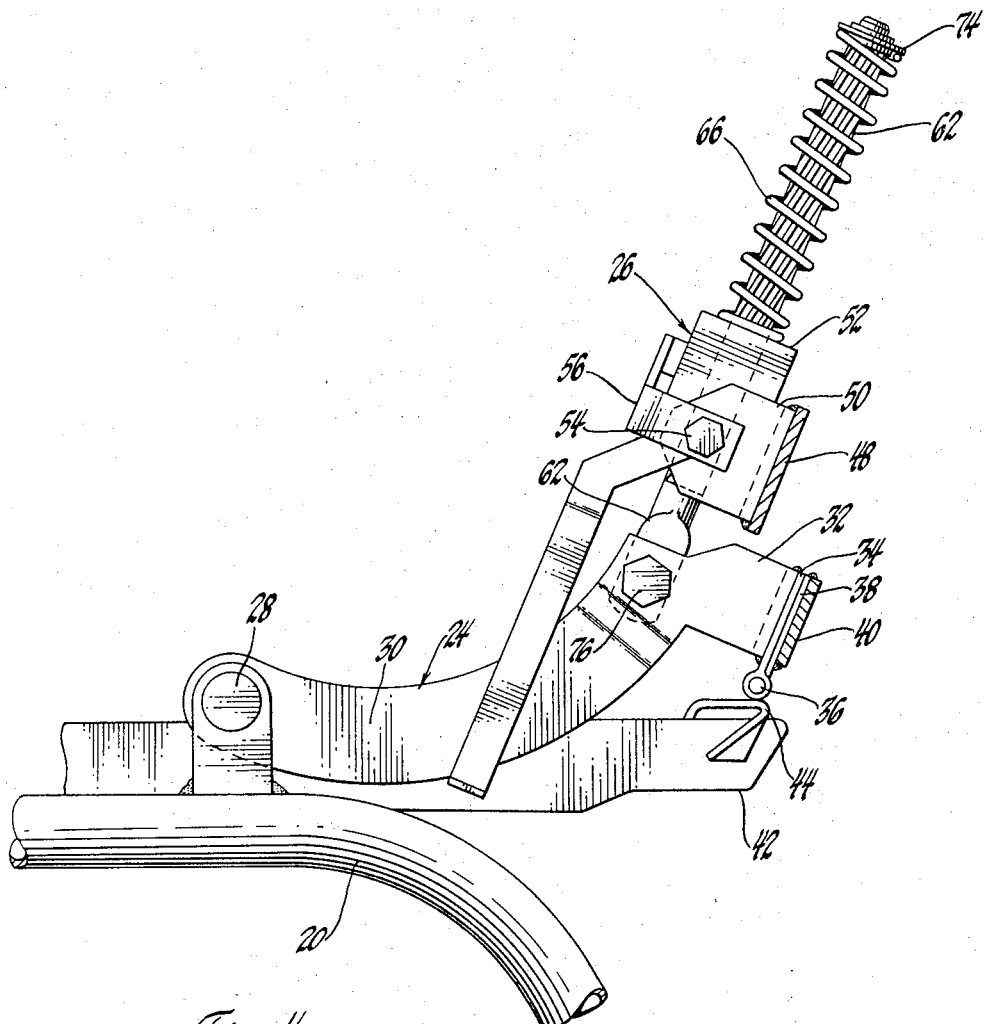
FIGURE 4 is a side elevational view partly broken away of the seat framework.

Referring now to the drawings, wherein like reference characters designate like or corresponding parts throughout the several views, there is shown in FIGURE 1 a perspective view of a seat in which the positioning mechanism may be utilized. FIGURES 2 and 3 show the frame of the reclining-backed seat in various positions including a reclined position in FIGURE 2, an upright position and a forwardly folded rear entry position in phantom in FIGURE 3. The seat framework comprises a seat frame 20; a seat back frame 22; a means to pivotally interconnect the two including an intermediate frame, generally shown at 24; and a positioning mechanism, generally shown at 26. The seat back frame 22 is pivotally connected to the seat frame 20 by the intermediate frame 24, which is pivoted at 28 to the seat frame 20. The intermediate frame 24 comprises a pair of spaced arms 30, more clearly shown in FIGURE 7, and a back bar 32, which is connected to or integral with the ends of arms 30. One leaf 34 of each of a pair of hinges is connected to the back bar 32. Each hinge has an articulable joint 36 and a second leaf 38 connected to the U-bar 40. The bar 40 is connected at each end thereof, as at 46, to the seat back frame 22. The articulable joint 36 of each respective hinge is supported by a support member 42 through a plate element 44. The articulable joint 36 of each hinge rests on a plate 44 to provide a stop to limit the pivotal movement of the intermediate frame 24. Consequently, the support members 42 support the seat back frame 22 in the upright position or any one of a plurality of reclined positions when the articulable joints 36 of the hinges rest against the plate elements 44. Conversely, as is shown in phantom in FIGURE 3, the articulable joint 36 of each hinge is lifted off the support member 42 when the intermediate frame 24 is moved to a forwardly folding rear entry position. The hinges, in addition to providing a pivotal means between the intermediate frame 24 and the seat back frame 22, also form a stop to limit the forward movement of the seat back frame 22 relative to the intermediate frame 24. As shown in FIGURE 4, the respective leaves 34 and 38 of each respective hinge contact each other to limit the forward movement of the seat back frame 22 relative to the intermediate frame 24.

As is more clearly shown in FIGURES 3, 5, and 7, the positioning mechanism 26 is connected to the seat back frame 22 through a connecting member 48. The positioning mechanism 26 has a support element 50 which is attached to the member 48. The support element 50 is connected to the housing 52 by bolts 54 which also pivotally secure a control means taking the form of a control bar 56 to the housing 52. The control bar 56 has a flange 60 which moves in the aperture 58 in the housing 52.

As indicated in FIGURES 2, 6, and 7, the positioning mechanism 26 comprises a positioning means including a male threaded element 62, a means movable relative to the male element taking the form of a female threaded element 64, and a spring biasing means 66. The threads on the male threaded element 62 have a long lead or take the form of what might be called a helical spline. The female threaded element 64 threadedly engages the male element 64 for rotation thereon and consequent movement therealong. The female element 64 takes the form of a nut which has notches 68 about its circumference. Any one of the notches 68 may receive the flange 60 of the control bar 56 so that the nut 64 may be selectively prevented from moving along the male element 62 by preventing rotation thereof. The housing 52 moves along the male element 62 due to the disposition of the bearings 70 and 72 which are mounted in each end of the housing in abutting relationship with each side of the female nut 64. The bearings 70 and 72 slide along the outside circumference of the threads on the male element 62.

A biasing spring 66 is disposed about the male threaded element 62 and acts against the housing 52 through the bearing 70. A spring retainer 74, more clearly shown in FIGURES 2, 4, and 5, is secured to one end of the male threaded element 62 to hold the spring in a position against the bearing 70. The opposite end of the male threaded element 62 is connected to the intermediate frame 24 by the bolt 76.

In operation, the seat may be moved to a forwardly folded rear entry position, as shown in phantom in FIGURE 3, or it may be moved to a position where the intermediate frame 24 is limited in further movement as the articulable hinge joints 36 abut the plate 44, as shown in FIGURES 2, 3, and 4. In this position the seat back frame 22 may be conveniently reclined to any one of a plurality of reclined positions, such as that shown in FIGURE 2. The seat back frame 22 is reclined by pivoting the control bar 56 to move the flange 60 out of engagement with the nut 64. A force is then applied to the seat back frame 22 pushing it toward a reclined position. The force is transmitted from the seat back frame 22 through the connection plate 48 to support member 50, to housing 52, and to bearing 72, which applies the force to the nut 64 to urge it along the male element. In response to the force urging the nut 64 along the male element 62, the nut 64 rotates and consequently moves along the male element 62. The threaded engagement between the nut 64 and the the male element 62 provides a resistance to movement of the nut 64 along the male element 62 thereby to prevent rapid acceleration of the seat back frame 22, that is, the resistance prevents the seat back frame from being slammed from one position to another and allows it to move at a predetermined controlled rate. Furthermore, the threaded engagement of the nut 64 with the male element 62 prevents the nut 64 from moving along the male element 62 when the flange 60 is not within a notch 68 and the seat back frame 22 is subjected to a force for less than a predetermined period. That is to say, if the flange 60 is disengaged from a notch 68 and a sharp force analogous to a punch is applied to the seat back frame, it will not move because the interaction of the male and female threaded elements provides sufficient resistance to overcome such a force. Conversely, if a sustained force is applied to the seat back frame 22 when the flange 60 is disengaged from a notch 68, the seat back frame will gradually accelerate and will thereafter steadily and smoothly move at a predetermined controlled rate so that the control bar 56 may be moved to engage the flange 60 in a notch 68 precisely when the desired position has been reached.

The resistance to movement by the threaded engagement between the male element 62 and the female element 64, therefore, alleviates the problem of moving the seat back frame back and forth until it may be positioned in the exact position desired. Once the desired reclined position is reached, the flange 60 of the control bar 56 is inserted into one of the notches 68 in the female nut 64. The flange 60 thus prevents the nut 64 from rotating, which prevents the nut from moving along the male element 62, which in turn prevents pivotal movement of the seat back frame 22. If the seat back frame 22 is in a reclined position, as illustrated in FIGURE 2, the control bar 56 may be pivoted to move the flange 60 out of a notch 68. Upon such actuation, a force is applied to the nut 64 by the bearing 70 as a consequence of the biasing of the spring 66. With no force acting against the seat back frame 22 counteracting the spring force, in other words, so that the spring force is the prevailing force, the nut 64 will rotate on the male threaded element 62 and consequently move therealong so that the seat back frame 22 moves toward the upright position. During this movement of the seat back frame 22 by the biasing spring 66 toward the upright position, the threaded engagement of the nut 64 with the male element 62 provides a resistance to rotation of the nut to prevent rapid acceleration of the seat back frame 22 and to allow the seat back to move at a substantially constant velocity. It is clear that the greater the helix angle, or the shorter the lead, of the threads, the greater the resistance to rotation of the nut. Therefore, a positioning mechanism having a long lead will allow a seat back to move from a fully reclined position to the upright position in a certain period of time when subjected to a given force, and a positioning mechanism having a shorter lead will allow such movement in a longer period of time when subjected to a force of the same magnitude. Furthermore, the resistance to rotation of the nut 64 on the male element 62 is a function of the axial force applied to the nut since the coefficient of friction between the coacting threaded surfaces is constant. That is to say, under a given axial force there will exist a certain component of force urging together the coacting threaded surfaces of the nut and male element respectively to cause a certain frictional force to resist rotation of the nut on the male element, and if the axial force is increased the coacting threaded surfaces will be urged together with greater force to cause a greater frictional force to resist rotation of the nut 64 on the male element 62. The seat back frame 22, therefore, moves at a substantially constant velocity from a reclined position to the upright position since in the reclined position the spring 66 is very compressed and applies a maximum axial force on the nut 64 thereby creating a maximum frictional force to resist rotation of the nut 64 on the male element 62, and conversely, when the seat back is near the upright position and the spring is compressed less than in more reclined positions, the spring is applying a small axial force so that the resistance to rotation of the nut is less than in more reclined positions. Due to this variable resistance to rotation of the nut, which varies in accordance with a force urging relative axial movement between the nut 64 and the male element 62, the velocity of the seat back frame 22, when moving from a reclined position toward the upright position in reaction to the biasing spring, is substantially constant.

If, however, it is desirable that the seat back frame 22 not be returned all of the way to the upright position, the control bar 56 may be moved to insert the flange 60 into a notch 68 of the nut 64 to selectively position the seat back frame 22 in an intermediate position. The forward movement of the seat back frame 22 in response to the spring 66 applying a force to the nut 64 is limited by the leaves 34 and 38 of the pair of hinges. That is to say, when the leaf 38 connected to the U-bar 40 contacts the leaf 34 connected to the bar 32, the seat back frame 22 is prevented from moving any farther in the forward direction relative to the intermediate frame 24.

It will be readily apparent to those skilled in the art that the positioning mechanism disclosed hereinbefore may be utilized between any two relatively movable members and is not limited to utilization in combination with a seat having a reclining back. As a correlative matter, it will also be noted that the size and weight of the two relatively movable members considered in light of the forces anticipated to be applied thereto will determine the helix angle or lead angle of the threads threadedly interconnecting the male element and the female element of the positioning mechanism; since the shorter the lead, i.e., greater helix angle, of the threads, the greater will be the resistance to relative axial movement between the male and female elements when a given axial force urges such movement. Furthermore, the threads may take many forms; for example, the male element may be square in cross section with the corners of the square being helically disposed about the male element so that a nut having a substantially square hole therethrough to match the male element may be placed on the male element for rotation thereon and consequent movement therealong. As a matter of fact, the male element may have any one of a variety of infinite shapes as viewed in cross section so long as the portions of the shape are helically disposed about the male element so that a nut having a matching internal shape may be disposed for rotation on and consequent movement along the male element. It will also be apparent that the seat back frame 22 may be connected through a pivotal means directly to the seat frame 20 rather than through an intermediate frame. Furthermore, it is evident that a variety and a plurality of springs may be utilized as biasing means in the positioning mechanism.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. A positioning mechanism comprising; a male threaded element having first and second ends, a first connection on said first end of said male element for allowing said male element to be attached to a first member, a female threaded element threadedly engaging said male element for rotation thereon and consequent axial movement therealong in response to a force urging relative axial movement between said male element and said female element, means engaging said female element for moving axially along said male element with said female element and for selectively preventing rotation of said female element on said male element, a second connection for allowing said means to be attached to a second member, and biasing means disposed between said second end of said male element and said first-mentioned means for urging said female element axially along said male element toward said first end thereof.

2. A positioning mechanism as set forth in claim 1 wherein said female threaded element comprises a nut having a plurality of notches disposed thereabout for receiving said first-mentioned means.

3. A positioning mechanism as set forth in claim 1 wherein said first-mentioned means comprises; a housing generally surrounding said female element, a first bearing disposed in abutting relationship with a first side of said female element, a second bearing disposed in abutting relationship with the second side of said female element, said bearings being mounted within said housing and slidably disposed on said male element, said housing having an aperture therein, and a control bar pivotably connected to said housing and having a means thereon moveable in said aperture upon pivotal movement of said control bar for engaging said female element to prevent rotation thereof.

4. A positioning mechanism as set forth in claim 1 wherein said biasing means comprises at least one spring.

5. A positioning mechanism comprising; a male threaded element having first and second ends, a first connection means on said first end of said male element for attaching said male element to a first member, a nut threadedly engaging said male element for rotation thereon and consequent axial movement therealong, said nut having a plurality of notches about the circumference thereof, a housing disposed about said nut, a first bearing disposed in a first end of said housing in abutting relationship to said nut and in sliding relationship along said male element, a second bearing disposed in the second end of said housing in abutting relationship to said nut and in sliding relationship along said male element, a second connection means on said housing for attaching said housing to a second member, said housing having an aperture therein, a control bar pivotably connected to said housing, a flange on said control bar movable in said aperture upon pivotal movement of said control bar for insertion into one of said notches to prevent rotation of said nut on said male element, a spring retaining means on said second end of said male element, and a spring disposed about said male element between said spring retaining means and said housing.

6. A reclining-backed seat assembly comprising: a seat frame; a seat back frame operably connected to said seat frame for pivotal movement relative thereto; a male threaded element operably connected by a first end thereof to said seat frame; a female threaded element threadedly engaging said male element for rotation thereon and consequent axial movement along said male element in response to a force urging relative axial movement between said male element and said female element; first means connected to said seat back frame and operably attached to said female element for movement therewith relative to said male element; control means attached to said first means for selectively preventing rotation of said female member; and biasing means disposed between the second end of said male element and said first means for urging said female element axially along said male element toward said first end thereof whereby, upon actuation of said control means to allow said female element to rotate, said seat back frame may be pivoted relative to said seat frame to any one of a plurality of reclining positions, in which one position said seat back frame may be secured by engaging said control means with said female element, and whereby said seat back frame will return to the upright position due to the force of said biasing means acting on said female element when said control means is disengaged from said female element to allow rotation thereof.

7. A reclining-backed seat assembly comprising: a seat frame; an intermediate frame pivotably connected to said seat frame; a seat back frame; pivotal means interconnecting said seat back frame and said intermediate frame for allowing said seat back frame to pivot relative to said intermediate frame between an upright position and any one of a plurality of reclined positions; a male threaded element connected at a first end thereof to said intermediate frame; a female threaded element threadedly engaging said male element for rotation thereon and consequent axial movement therealong in response to a force urging relative axial movement between said male element and said female element; first means connected to said seat back frame and operably attached to said female element for axial movement therewith relative to said male element; control means attached to said first means for selectively engaging said female element to prevent rotation of said female element on said male element; and biasing means disposed between the second end of said male element and said first means for urging said female element axially along said male element toward said first end thereof whereby, upon disengaging said control means from said female element to allow said female element to rotate, said seat back frame may be rotated relative to said seat frame and said intermediate frame through said pivotal means to any one of said plurality of reclining positions, in which one position said seat back frame may be secured by engaging said control means with said female element to prevent rotation of said female element, and whereby said seat back frame will return to said upright position due to the force of said biasing means acting on said female element to cause same to rotate when said control means is disengaged from said female element.

8. A reclining-backed seat assembly comprising: a seat frame; a seat back frame; an intermediate frame; a hinge having an articulable joint connected by a first leaf thereof to said intermediate frame and by a second leaf thereof to said seat back frame for allowing said seat back frame to be moved relative to said intermediate frame from an upright position to any one of a plurality of reclined positions; said intermediate frame being pivotally connected to said seat frame for movement of said intermediate frame to a forwardly folded rear entry position; support means attached to said seat frame to provide a stop for said articulable joint to limit movement of said intermediate frame and for supporting said seat back frame as said articulable joint acts thereagainst and said seat back frame is in any one of said upright and reclined positions; a male threaded element connected by a first end thereof to said intermediate frame; a female threaded element threadedly engaging said male element for rotation thereon and consequent axial movement therealong in response to a force urging relative axial movement between said male element and said female element; a first means engaging said female element for axial movement along said male element with said female element; a second means attached to said first means for selectively preventing rotation of said female element on said male element; said first means being connected to said seat back frame; and biasing means disposed between the second end of said male element and said first means for urging said female element axially along said male element toward said first end of said male element.

9. The assembly as set forth in claim 8 wherein said female threaded element comprises a nut having a plurality of notches disposed about its circumference for receiving said second means.

10. The assembly as set forth in claim 8 wherein said biasing means comprises at least one spring.

11. The assembly as set forth in claim 8 wherein said first means comprises; a housing generally surrounding said female element, a first bearing disposed in abutting relationship with a first side of said female element, a second bearing disposed in abutting relationship with the second side of said female element, and said bearings being mounted within said housing and engaging said male element in a sliding relationship therewith.

12. The assembly as set forth in claim 11 wherein said second means comprises: a control bar pivotally connected to said housing, said housing having an aperture therein, and means on said control bar for movement in said aperture to engage and disengage said female element upon pivotal movement of said control bar.

13. A reclining-backed seat assembly comprising: a seat frame; a pair of spaced arms pivotally connected to said seat frame; a back bar connected at each end thereof to said respective arms; a pair of spaced hinges each having an articulable joint and each connected by one leaf thereof to said back bar; a support attached to said seat frame for engaging the respective articulable joints of said hinges and to provide a stop for the pivotal movement of said arms and back bar; a seat back frame; a U-bar connected at its respective ends to each side of said seat back frame; said hinges each being respectively connected to said U-bar by the second leaf thereof to allow said seat back frame to rotate relative to said arms and said seat frame to any one of a plurality of reclining positions, and for limiting said rotation of said seat back frame in an upright position as the first leaf and the second leaf of each respective hinge abut one another; a male threaded element pivotally connected at a first end thereof to one of said arms; a nut threadedly engaging said male element for rotation thereon and consequent axial movement therealong; said nut having a plurality of notches about the circumference thereof; a housing disposed about said nut; a first bearing disposed in a first end of said housing in abutting relationship with said nut and in sliding relationship with said male element; a second bearing disposed in the second end of said housing in abutting relationship with said nut and in sliding relationship with said male element; said housing being connected to said seat back frame; said housing having an aperture therein; a control bar pivotally connected to said housing; a flange on said control bar movable in said aperture upon pivotal movement of said control bar for insertion into one of said notches to prevent rotation of said nut on said male element; a spring retaining means on said second end of said male element; and a spring disposed about said male element between said spring retaining means and said housing.

14. A positioning mechanism comprising a male threaded element, a female threaded element threadedly engaging said male element for rotation thereon and consequent relative axial movement therealong in response to a force urging relative axial movement between said male element and said female element, first means for selectively preventing rotation of said female element to prevent said relative axial movement between said male element and said female element, biasing means for urging relative axial movement between said female element and said male element to cause said female element to rotate and to move axially along said male element when said first means allows said female element to rotate, said first means being operatively attached to said female element for movement therewith relative to said male element and including control means operatively attached thereto for selectively preventing rotation of said female element, said female element comprising a nut having a plurality of notches disposed thereabout for receiving said control means, said first means comprising a housing generally surrounding said female element, said control means comprising a control bar pivotally connected to said housing and including a flange on said control bar movable through an aperture in said housing upon pivotal movement of said control bar for insertion into one of said notches to prevent rotation of said nut.

15. A positioning mechanism as set forth in claim 14 including first bearing means disposed in abutting relationship with a first side of said female element and a second bearing means disposed in abutting relationship with the second side of said female element, said bearing means being mounted in said housing for movement with said female element along said male element, and wherein said biasing means includes at least one spring.

16. A positioning mechanism as set forth in claim 15 wherein a first end of said male element is adapted for connection to a movable member, spring retainer means on the second end of said male element, said spring being disposed about said male element between said spring retainer means and said first bearing means, said housing being adapted for connection to another movable member.

References Cited
UNITED STATES PATENTS

| | | | |
|---|---|---|---|
| 2,311,105 | 2/1943 | Will | 297—367 |
| 2,579,305 | 12/1951 | Cushman | 297—375 X |
| 2,845,994 | 8/1958 | Thompson | 297—358 |
| 2,959,206 | 11/1960 | Tedesco | 297—367 |
| 3,036,862 | 5/1962 | Beierbach | 297—367 |
| 3,046,055 | 6/1962 | Martens | 297—361 |
| 3,123,401 | 3/1964 | Komenda | 297—379 |
| 3,195,952 | 7/1965 | Bache et al. | 297—374 |
| 3,230,554 | 1/1966 | Peterson | 297—361 X |
| 3,259,433 | 7/1966 | Warner | 297—367 |

BOBBY R. GAY, *Primary Examiner.*

FRANK B. SHERRY, *Examiner.*

G. O. FINCH, *Assistant Examiner.*